United States Patent [19]

Carpino

[11] 4,119,588

[45] Oct. 10, 1978

[54] REVERSION RESISTANT RUBBER COMPOSITIONS WITH THIO CARBAMYL SULFENAMIDES

[75] Inventor: John Steven Carpino, Broadview Heights, Ohio

[73] Assignee: The B. F. Goodrich Company, Akron, Ohio

[21] Appl. No.: 723,123

[22] Filed: Sep. 14, 1976

[51] Int. Cl.$^2$ .............................. C08F 8/34; C08L7/00
[52] U.S. Cl. .................................. 260/5; 152/357 R; 260/79.5 B; 260/887; 260/890; 260/892; 260/893; 260/894; 526/38; 526/17; 526/20; 526/34
[58] Field of Search ..................... 260/5, 79.5 B, 894, 260/887, 892, 890, 893

[56] References Cited

U.S. PATENT DOCUMENTS

| | | | |
|---|---|---|---|
| 3,294,714 | 12/1966 | Peterson | 260/5 |
| 3,324,075 | 6/1967 | Burak | 260/5 |
| 3,337,520 | 8/1967 | Bjornson | 260/5 X |
| 3,821,134 | 6/1974 | Son | 260/887 X |
| 3,883,592 | 5/1975 | Gattuso | 260/567 |
| 3,910,864 | 10/1975 | Son | 260/79.5 B |

*Primary Examiner*—Christopher A. Henderson, Jr.
*Attorney, Agent, or Firm*—J. A. Powell; J. H. Powell, Jr.

[57] ABSTRACT

Reversion resistant rubber compositions comprising 100 parts by weight of sulfur vulcanizable rubber(s) of which at least 50 parts by weight are natural rubber and/or cis-polyisoprene, sulfur, a thiocarbamyl sulfenamide accelerator, and optionally a benzothiazole accelerator and/or a thiazole sulfenamide accelerator.

19 Claims, No Drawings

REVERSION RESISTANT RUBBER COMPOSITIONS WITH THIO CARBAMYL SULFENAMIDES

BACKGROUND OF THE INVENTION

When a rubber article is vulcanized, it goes through a soft tacky stage characteristic of unvulcanized rubber to a tack free tough stage characteristic of fully vulcanized rubber. If heat is applied after the optimum vulcanization is reached, the rubber will begin to exhibit what is commonly known as reversion. Once rubber has begun to revert, many of its desirable properties are lost. Reversion can occur because of excess heat applied during vulcanization. Because of the relatively low heat conductivity of rubber, thick rubber articles, such as large tires, are normally vulcanized for a period of time far in excess of the time required to vulcanize the surface of the article. This excess exposure to high temperature causes the properties of the rubber close to the surface to deteriorate. Thin rubber articles, such as rubber bands, can also experience reversion because high vulcanization temperatures are used in order to maximize the production capacity.

Reversion of rubber can also occur during the use of rubber articles. When rubber articles are flexed, heat is generated internally in the rubber. This generated heat can be of such magnitude as to cause reversion. This occurs quite frequently in large tires, such as truck, bus, airplane, and off-the-road tires.

Several synthetic elastomers have excellent reversion resistance, such as EPDM, butyl, and the like. These elastomers, although excellent for reversion resistance, have high heat buildup properties, which preclude their use in certain areas of articles such as large tires.

Natural rubber and its synthetic counterpart cis-polyisoprene are excellent elastomers for low heat buildup properties and for this reason, these elastomers are used quite extensively in thick rubber articles that are subjected to severe flexing, such as large tires. Although natural rubber has low heat buildup properties, unfortunately, natural rubber also has a greater tendency to revert than does other general purpose elastomers, such as styrene-butadiene, cis-polybutadiene and the like.

SUMMARY OF THE INVENTION

The reversion resistant rubber compositions comprise (1) 100 parts by weight of a sulfur vulcanizable rubber of which at least 50 parts by weight are natural rubber and/or cis-polyisoprene, (2) sulfur, (3) a thiocarbamyl sulfenamide accelerator, and optionally (4) a benzothiazole accelerator and/or thiazole sulfenamide accelerator. The compositions represent a unique balance of low heat buildup properties and excellent reversion resistance. The compositions are particularly useful to prepare rubber articles that require relatively long vulcanization times and/or are subject to a high vulcanization temperature. Such articles would be tires, belting, hose, gasketing, seals, bands, and the like.

DETAILED DESCRIPTION

Cis-polyisoprene is recognized as the synthetic equivalent of natural rubber and wherever the term natural rubber is used in this disclosure, the term cis-polyisoprene can be substituted for the term natural rubber.

The sulfur vulcanizable rubber contains at least 50 percent of the rubber as natural rubber, more preferably 100 percent of the rubber is natural rubber. The remainder of the sulfur vulcanizable rubber can be any sulfur vulcanizable rubber which is co-vulcanizable with natural rubber. Examples of such polymers are high unsaturation rubbers such as cis-polybutadiene, emulsion polybutadiene, butadiene acrylonitrile, isoprene acrylonitrile, polychloroprene, polypentenamer, butadiene-styrene, isoprene-styrene, and the like; and low unsaturation polymers such as isoprene-isobutylene and ethylene-propylenediene polymers and the like. Blends of two or more sulfur vulcanizable rubbers are readily employed.

The second ingredient in the composition is sulfur. The level employed ranges from about 0.1 part to 3 parts by weight of sulfur per 100 parts by weight of sulfur vulcanizable rubber, more preferably the level of sulfur is from about 0.3 part to about 1.5 parts by weight per 100 parts by weight of sulfur vulcanizable rubber. Maximum reversion resistance is obtained when the sulfur level is below 1.5 parts by weight per 100 parts by weight of sulfur vulcanizable rubber.

The third necessary ingredient is at least one thiocarbamyl sulfenamide accelerator. The thiocarbamyl sulfenamides are prepared according to U.S. Pat. No. 3,892,741 by the reaction of a monohaloamine or mixtures thereof with a thiocarbonate salt. Suitable thiocarbamyl sulfenamides have the formula

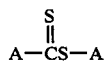

wherein A is selected from the group consisting of

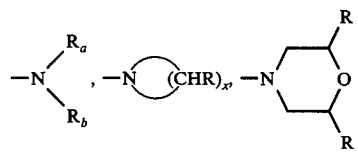

and mixtures thereof, where $R_a$ and $R_b$ are selected from the group consisting of hydrogen, an alkyl radical containing 1 to 24 carbon atoms, a cyanoalkyl radical containing 2 to 12 carbon atoms, an alkoxyalkyl radical containing 2 to 12 carbon atoms, a cycloalkyl radical containing 4 to 8 carbon atoms in the ring, phenyl, and alkaryl, or aralkyl radical containing 7 and 18 carbon atoms in the radical; and where R is hydrogen or an alkyl radical containing 1 to 4 carbon atoms and $x = 4$ to 7.

Examples of such compounds are thiocarbamyl-sulfenamide and the derivatives thereof as N, N-dimethyl-thiocarbamyl sulfenamide; N-methyl-N'-ethylthiocarbamyl-sulfenamide; N, N, N', N'-tetraethylthiocarbamylsulfenamide; N, N, N', N'-tetrabutylthiocarbamylsulfenamide; N-methyl-N', N'-diisopropylthiocarbamylsulfenamide; N, N-dimethyl-N', N'-dicyclohexylthiocarbamylsulfenamide; N-octyl-N'-butylthiocarbamylsulfenamide; N, N-didodecylthiocarbamylsulfenamide; N, N-di-octyldecylthiocarbamylsulfenamide; N-isopropyl-N', N'-dicyclobutylthiocarbamylsulfenamide; N-methyl-N-phenyl-N', N'-dimethylthiocarbamylsulfenamide; N, N-dimethyl-N'-tetramethylenethiocarbamylsulfenamide; N'-oxydiethylenethiocarbamylsulfenamide; N- N-dimethyl-N'-oxydiethylenethiocarbamylsulfenamide; N, N-di-(α-cyanopropyl) thiocarbamylsulfenamide; N, N, N', N'-tetramethoxyethylthiocarbamylsulfenamide; N, N-diallyl-N'-dimethylthiocarbamylsulfenamide; N, N-dibutyl-N', N'-dicyclohexylthiocarbamylsulfenamide; N-cyclooctyl-N', N'-(1,3-dimethylhexyl) thiocarbamylsulfenamide; N-benzyl-N', N'-diethylthiocarbamylsulfenamide; N-pentamethylene-N', N'-dipropylthiocarbamylsulfenamide; N, N'-di-(tetramethylene) thiocarbamylsulfenamide; N, N'-di-(pentamethylene) thiocarbamylsulfenamide; N, N'-di-(hexamethylene) thiocarbamylsulfenamide; N-pentamethylene-N'-oxydiethylenethiocarbamylsulfenamide; N-heptamethylene-N'-oxydiethylenethiocarbamylsulfenamide; N, N'-di-(oxydiethylene) thiocarbamylsulfenamide; N-oxydiethylene-N'-2,6-dimethyloxydiethylenethiocarbamylsulfenamide; N, N'-di-(2,6-dimethyloxydiethylene) thiocarbamylsulfenamide; and N-2,6-dimethyloxydiethylene-N'-ethylthiocarbamylsulfenamide. More preferred, the thiocarbamyl sulfenamides are N, N-dimethyl-N', N' dicyclohexylthiocarbamylsulfenamide and N, N'-di-(oxydiethylene) thiocarbamylsulfenamide. Excellent results are obtained when employing N, N'-di-(oxydiethylene) thiocarbamylsulfenamide.

The level of thiocarbamylsulfenamide employed ranges from about 0.5 part to about 5 parts by weight per 100 parts by weight of rubber, more preferably from about 1 part to about 3 parts by weight per 100 parts by weight of rubber.

As an optional fourth ingredient, the compositions can contain either a benzothiazole accelerator or a thiazole sulfenamide accelerator.

The benzothiazole accelerator is a 2-thiobenzothiazole of the formula

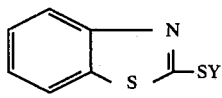

wherein Y is a member selected from the group consisting of hydrogen; 1 to 18 carbon atom alkyl; aryl; halo, nitro-, anilino- and alkyl-substituted aryl; a benzothiazolethio radical; and a mono- or divalent radical selected from the group ammonium, sodium, potassium, calcium, zinc, cadmium, copper and lead. When Y is a divalent metal, the second valence of the metal may be satisfied with an alkyl, aryl, substituted-aryl or preferably with a second 2-thiobenzothiazole radical. In this latter instance, the compound will correspond to the structure

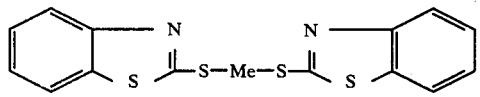

wherein Me is the divalent metal, preferably zinc, cadmium or lead. Exemplary benzothiazole compounds include: 2-mercaptobenzothiazole, 2-octylthiobenzothiazole, 2, 2'-mercaptobenzothiazole disulfide, sodium 2-mercaptobenzothiazole, potassium 2-mercaptobenzothiazole, ammonium 2-mercaptobenzothiazole, zinc 2-mercaptobenzothiazole, 2-(2,4-dinitrophenylthio)-benzothiazole, and the like. Excellent resuls are obtained when 2,2'-mercaptobenzothiazole disulfide is employed.

The level of 2-thiobenzothiazole used is from about 0.5 part to 3.0 parts by weight per 100 parts by weight of rubber. Preferably, the level of 2-thiobenzothiazole used is from about 1 part to 2 parts by weight per 100 parts by weight of rubber.

The second optional ingredient is a thiazole sulfenamide accelerator of the formula T—S—B wherein B is selected from the group consisting of

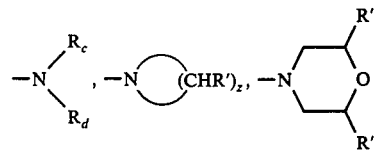

wherein $R_c$ and $R_d$ are hydrogen, alkyl radicals containing 1 to 24 carbon atoms, an aryl radical containing 6 to 18 carbon atoms, alkaryl radical or aralkyl radical containing 7 to 18 carbon atoms, a cycloalkyl radical containing 3 to 8 carbon atoms in the ring, and R' is hydrogen or an alkyl radical containing 1 to 4 carbon atoms and z is 2 to 7; and T is a thiazole ring and especially a benzothiazole ring. The alkyl radicals can be linear or branched and can contain primary, secondary and/or tertiary carbon atom configurations. The aryl, alkaryl, aralkyl, cycloalkyl and thiazole radicals can further be substituted with alkyl radicals containing 1 to 8 carbon atoms.

Examples of the thiazole sulfenamide compounds are N, N-diemthyl-2-benzothiazylsulfenamide, N, N-diisopropyl-2-(4,5-dimethylthiazyl) sulfenamide, N-methyl-N-cyclohexyl-2-(4,5-dimethylthiazylsulfenamide), N, N-diisopropyl-2-benzothiazylsulfenamide, N, N-diethyl-2-benzothiazylsulfenammide, N-methyl-N-benzyl-2-benzothiazylsulfenamide, N, N-di(tert-butyl)-2-benzothiazylsulfenamide, N, N-dicyclohexyl-2-benzothiazylsulfenamide, N-pentamethylene-2-benzothiazylsulfenamide, N-oxydiethylene-2-benozthiazylsulfenamide, N-(2,6-dimethyl)-oxydiethylene-2-benzothiazylsulfenamide, N, N-dimethyl-2-(4,6-dimethylbenzothiazyl)sulfenamide, and the like.

More preferably, the thiazole sulfenamide is a benzothiazole sulfenamide of the formula

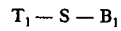

where $T_1$ is a benzothiazole ring which can be substituted with 1 to 4 carbon atom alkyl groups and $B_1$ is selected from the group consisting of

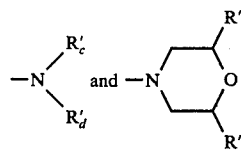

where $R_c'$ and $R_d'$ are alkyl radicals containing 1 to about 18 carbon atoms or a phenyl or cyclohexyl radical, and R' is as defined above. Examples of the more preferred compounds are N, N-diethyl-2-benzothiazylsulfenamide, N, N-diisopropyl-2-benzothiazylsulfenamide, N, N-dioctyl-2-benzothiazylsulfenamide, N, N-dioctadecyl-2-benzothiazylsulfenamide, N, N-dicyclohexyl-2-benzothiazylsulfenamide, N, N-diphenyl-2-benozthiazylsulfenamide, N-oxydiethylene-2-benzothiazylsulfenamide, and the like. Excellent results are obtained when employing N-oxydiethylene-2-benzothiazylsulfenamide.

The thiazole sulfenamide accelerator is used in a level from about 0.5 part to about 5 parts by weight per 100 parts by weight of rubber. The preferred level of thiazole sulfenamide used is from about 1 part to about 2.5 parts by weight per 100 parts by weight of rubber.

Many compounding ingredients may be used with the novel compositions. Such ingredients include activators such as zinc, calcium, and magnesium oxide, lead monoxide and dioxide, fatty acids such as stearic and lauric acid, and salts thereof such as cadmium, zinc, and copper stearate and lead oleate. Fillers may also be used such as channel blacks, reinforcing blacks, and thermal blacks, calcium and magnesium carbonate, calcium and barium sulfates, aluminum silicates phenol-formaldehyde and polystyrene resins, asbestos, and the like. Plasticizers and extenders may also be used such as aromatic, naphthalenic, and paraffinic oils, castor oil, tall oil, glycerin, and the like. Antioxidants, antiozonates, and stabilizers may be used in the novel compositions.

The compounding ingredients are added to the rubber using internal mixers such as banburys or using two-roll mills and the like. The sulfur and accelerators are added to the rubber near the end of the mixing cycle to minimize premature vulcanization.

The novel reversion resistant rubber compositions described herein were evaluated for their reversion resistance using a Monsanto Rheometer and measuring the decrease from maximum torque at excess vulcanization times. The reduction in torque from maximum torque is due to reversion. Reversion was also evaluated by measuring the retention of tensile and elongation properties after extended vulcanization times. Tensile and elongation were measured following ASTM D-412. Compression Set, ASTM D-395-Method B, is also a measure of reversion resistance of a rubber compound.

EXAMPLE I

Natural rubber is mixed with various rubber compounding ingredients to provide a masterbatch according to the recipe: 100 parts by weight of natural rubber, 50 parts high structure HAF carbon black, 5 parts zinc oxide, 3 parts stearic acid, 5 parts processing oil, and 2 parts antioxidant (2,2-methylenebis, 4-methyl-6-tertiary-butylphenol). The masterbatch is mixed in a Banbury mixer following a standard mixing procedure. Portions of the masterbatch are put on a two-roll mill, and curative ingredients are added. Table I shows the recipes evaluated in parts by weight along with testing data. Sample 1 is a conventional cure system for natural rubber of sulfur and N-oxydiethylene-2-benzothiazylsulfenamide (OBTS). Samples 2 through 5 employ the novel cure system of sulfur, N, N'-di-(oxydiethylene) thiocarbamylsulfenamide (TCS) and optionally OBTS or 2,2'-mercaptobenzothiazole disulfide (MBTS). Table I shows the novel cure systems of sulfur, TCS, and optionally OBTS or MBTS to be superior for reversion resistance to the known composition of Sample 1, as measured by retained Monsanto Rheometer torque and compression set.

TABLE I

| | SAMPLE NUMBER | | | | |
|---|---|---|---|---|---|
| | CONTROL 1 | 2 | 3 | 4 | 5 |
| INGREDIENT | | | | | |
| Masterbatch | 165.0 | 165.0 | 165.0 | 165.0 | 165.0 |
| MBTS[1] | — | — | — | — | 1.5 |
| OBTS[2] | 0.8 | 1.5 | 1.5 | 1.5 | — |
| TCS[3] | — | 1.5 | 2.0 | 2.5 | 2.0 |
| Sulfur | 2.5 | 0.5 | 0.5 | 0.5 | 0.5 |
| TEST | | | | | |
| Monsanto Rheometer at 350° F, ± 1° Arc | | | | | |
| Maximum Torque | 33.5 | 33.0 | 35.0 | 35.5 | 36.0 |
| Time (Min.) to 95% Max Torque | 4.3 | 4.8 | 5.3 | 5.3 | 4.6 |
| Percentage of Max Torque Remaining at Time | | | | | |
| 15 minutes | 81.0 | 100.0 | 100.0 | 100.0 | 100.0 |
| 30 minutes | 73.0 | 99.0 | 99.0 | 99.0 | 99.0 |
| Compression Set 25% Compression 48 Hours at 212° F | | | | | |
| Cure 20 Minutes at 350° F | | | | | |
| Percent Set | 53.0 | 28.0 | 26.0 | 25.0 | 27.0 |
| Cure 90 Minutes at 350° F | | | | | |
| Percent Set | 37.0 | 21.0 | 22.0 | 21.0 | 18.0 |

[1] 2,2'-mercaptobenzothiazole disulfide
[2] N-oxydiethylene-2-benzothiazylsulfenamide
[3] N,N'-di-(oxydiethylene) thiocarbamylsulfenamide

EXAMPLE II

Natural rubber is mixed with various rubber compounding ingredients to provide a masterbatch according to the recipe: 100 parts by weight of natural rubber, 50 parts high structure HAF carbon black, 5 parts zinc oxide, 3 parts stearic acid, 5 parts processing oil, and 2 parts antioxidant (2,2-methylenebis, 4-methyl-6-tertiary-butyl-phenol). The masterbatch is mixed in a Banbury mixer following a standard mixing procedure. Portions of the masterbatch are put on a two-roll mill, and curative ingredients are added. Table II shows the recipes evaluated in parts by weight along with testing data. Sample 6 is a widely used reversion resistant cure system of sulfur, OBTS, and dithiodimorpholine (DTDM). Samples 7 through 10 employ the novel cure system of sulfur, N, N'-di-(oxydiethylene) thiocarbamylsulfenamide (TCS) and optionally OBTS or 2,2'-mercaptobenzothiazole disulfide (MBTS). Table II shows the novel cure systems of sulfur, TCS, and optionally OBTS or MBTS to be superior for reversion resistance to the known reversion resistant compositions of Samples 6, as measured by retained Monsanto Rheometer torque and compression set.

TABLE II

| INGREDIENT | CONTROL 6 | 7 | 8 | 9 | 10 |
|---|---|---|---|---|---|
| Masterbatch | 165.0 | 165.0 | 165.0 | 165.0 | 165.0 |
| MBTS | — | — | — | — | 1.5 |
| OBTS | 1.5 | 1.5 | 1.5 | 1.5 | — |
| DTDM[4] | 2.0 | — | — | — | — |
| TCS | — | 1.5 | 2.0 | 2.5 | 2.0 |
| Sulfur | 0.5 | 0.5 | 0.5 | 0.5 | 0.5 |
| TEST | | | | | |
| Monsanto Rheometer at 350° F, ± 1° Arc | | | | | |
| Maximum Torque | 34.0 | 33.0 | 35.0 | 35.5 | 36.0 |
| Time (Min.) to 95% Max Torque | 4.9 | 4.8 | 5.3 | 5.3 | 4.6 |
| Percentage of Max Torque Remaining at Time | | | | | |
| 15 minutes | 95.0 | 100.0 | 100.0 | 100.0 | 100.0 |
| 30 minutes | 89.0 | 99.0 | 99.0 | 99.0 | 99.0 |
| Compression Set 25% Compression 48 Hours at 212° F | | | | | |
| Cure 20 Minutes at 350° F Percent Set | 42.0 | 28.0 | 26.0 | 25.0 | 27.0 |
| Cure 90 Minutes at 350° F Percent Set | 29.0 | 21.0 | 22.0 | 21.0 | 18.0 |

[4]Dithiodimorpholine

EXAMPLE III

This example is presented to show a direct comparison between OBTS and N, N'-di-(oxydiethylene) thiocarbamylsulfenamide. Natural rubber is mixed with various rubber compounding ingredients to provide a masterbatch according to the recipe: 100 parts by weight of natural rubber, 50 parts high structure HAF carbon black, 5 parts zinc oxide, 3 parts stearic acid, 5 parts processing oil, and 2 parts antioxidant (2,2-methylenebis, 4-methyl-6-tertiary-butyl-phenol). The masterbatch is mixed in a Banbury mixer following a standard mixing procedure. Portions of the masterbatch are put on a two-roll mill, and curative ingredients are added. Table III shows the recipes evaluated in parts by weight along with testing data. Sample 11 is a well-known reversion resistant cure system of a low level of sulfur and a high level of OBTS. Sample 12 employs the novel cure system of sulfur and N, N'-di-(oxydiethylene) thiocarbamylsulfenamide (TCS). Table III shows the novel cure systems of sulfur and TCS to be superior for reversion resistance to the known reversion resistant composition of Sample 11, as measured by retained Monsanto Rheometer torque and compression set.

TABLE III

| INGREDIENT | 11 | 12 |
|---|---|---|
| Masterbatch | 165.0 | 165.0 |
| MBTS | — | — |
| OBTS | 2.0 | — |
| DTDM | — | — |
| TCS | — | 2.0 |
| Sulfur | 0.5 | 0.5 |
| TEST | | |
| Monsanto Rheometer at 350° F, ± 1° Arc | | |
| Maximum Torque | 26.0 | 27.0 |
| Time (Min.) to 95% Max Torque | 4.8 | 5.5 |
| Percentage of Max Torque Remaining at Time | | |
| 15 minutes | 94.0 | 98.0 |
| 30 minutes | 88.0 | 94.0 |
| Compression Set 25% Compression 48 Hours at 212° F | | |
| Cure 20 Minutes at 350° F Percent Set | 45.0 | 30.0 |
| Cure 90 Minutes at 350° F Percent Set | 44.0 | 23.0 |

EXAMPLE IV

This example is presented to show the reversion resistance imparted by the novel vulcanization system to a two-way blend of 80 parts by weight natural rubber with 20 parts by weight cis-polybutadiene rubber (CB). A masterbatch is mixed according to the recipe: 80 parts by weight of natural rubber, 20 parts by weight of cis-polybutadiene, 50 parts high structure HAF carbon black, 5 parts zinc oxide, 3 parts stearic acid, 5 parts processing oil, and 2 parts antioxidant. The same mixing procedure is used in this example as in the previous examples. Table IV shows the recipes evaluated in parts by weight along with testing data. In the two-way polymer blend, a well known reversion resistant cure system of sulfur, OBTS, DTDM is used as the control (Sample 13). In Sample 14, N, N' di-(oxydiethylene) thiocarbamylsulfenamide (TCS) is substituted at equal part level for DTDM. Table IV shows the novel cure system of sulfur, TCS, and OBTS to be superior for reversion resistance to the cure system of sulfur, OBTS, and DTDM as measured by retained tensile, retained Monsanto Rheometer torque, and compression set.

TABLE IV

| INGREDIENT | Control 13 | 14 |
|---|---|---|
| Masterbatch | 165.0 | 165.0 |
| Sulfur | 0.5 | 0.5 |
| OBTS | 1.5 | 1.5 |
| DTDM | 2.0 | — |
| TCS | — | 2.0 |
| TEST | | |
| Monsanto Rheometer at 350° F, ± 1° Arc | | |
| Maximum Torque | 37.5 | 38.5 |
| Time (Min.) to 95% Torque | 4.5 | 5.5 |
| Percentage of Max Torque Remaining at Time | | |
| 15 minutes | 96.0 | 100.0 |
| 30 minutes | 92.0 | 99.0 |
| Compression Set 25% Compression 48 Hours at 212° F | | |
| Cure 20 Minutes at 350° F Percent Set | 40.0 | 25.0 |
| Cure 90 Minutes at 350° F Percent Set | 25.0 | 21.0 |
| Stress-Strain Cure at 350° F | | |
| Tensile psi | | |
| 5 minutes | 3960.0 | 3665.0 |
| 40 minutes | 3160.0 | 3290.0 |
| 60 minutes | 3140.0 | 3250.0 |
| 300% Modulus psi | | |
| 5 minutes | 2350.0 | 2545.0 |

TABLE IV-continued

| | SAMPLE NUMBER | |
|---|---|---|
| | Control 13 | 14 |
| 40 minutes | 2010.0 | 2555.0 |
| 60 minutes | 2140.0 | 2400.0 |
| Stress-Strain Cure at 350° F | | |
| Percent Elongation | | |
| 5 minutes | 455.0 | 400.0 |
| 40 minutes | 420.0 | 365.0 |
| 60 minutes | 400.0 | 380.0 |
| Tensile as Percent Maximum Retained | | |
| After 60 Minutes | 79.0 | 89.0 |
| Percent Elongation as Percent Maximum | | |
| Retained After 60 Minutes | 88.0 | 95.0 |

EXAMPLE V

This example is presented to show the reversion resistance imparted by the novel vulcanization system to a two-way blend of 80 parts by weight natural rubber with 20 parts by weight styrene-butadiene rubber (SBR). A master-batch is prepared as in example IV except SRB is substituted for CB. Table V shows the recipes evaluated in parts by weight along with testing data. A well known reversion resistant cure system of sulfur, OBTS, DTDM is used as the control (Sample 15). In Sample 16, N, N' di-(oxydiethylene) thiocarbamylsulfenamide (TCS) is substituted at equal part level for DTDM. Table V shows the cure systems of sulfur, TCS, and OBTS to be superior for reversion resistance to the cure system of sulfur, OBTS, and DTDM as measured by retained tensile, retained Monsanto Rheometer torque, and compression set.

TABLE V

| | SAMPLE NUMBER | |
|---|---|---|
| | Control 15 | 16 |
| INGREDIENT | | |
| Masterbatch | 165.0 | 165.0 |
| Sulfur | 0.5 | 0.5 |
| OBTS | 1.5 | 1.5 |
| DTDM | 2.0 | — |
| TCS | — | 2.0 |
| TEST | | |
| Monsanto Rheometer at 350° F, ± 1° Arc | | |
| Maximum Torque | 35.0 | 36.0 |
| Time (Min.) to 95% Torque | 5.6 | 6.3 |
| Percentage of Max Torque Remaining at Time | | |
| 15 minutes | 98.0 | 100.0 |
| 30 minutes | 93.0 | 99.0 |
| Compression Set 25% Compression 48 Hours at 212° F | | |
| Cure 20 Minutes at 350° F Percent Set | 41.0 | 23.0 |
| Cure 90 Minutes at 350° F Percent Set | 24.0 | 20.0 |
| Stress-Strain Cure at 350° F | | |
| Tensile psi | | |
| 5 minutes | 4100.0 | 3625.0 |
| 40 minutes | 3045.0 | 3235.0 |
| 60 minutes | 3250.0 | 3290.0 |
| 300 % Modulus psi | | |
| 5 minutes | 2345.0 | 2350.0 |
| 40 minutes | 2175.0 | 2450.0 |
| 60 minutes | 2220.0 | 2370.0 |
| Stress-Strain Cure at 350° F | | |
| Percent Elongation | | |
| 5 minutes | 470.0 | 420.0 |
| 40 minutes | 380.0 | 370.0 |
| 60 minutes | 395.0 | 385.0 |
| Tensile as Percent Maximum Retained | | |
| After 60 Minutes | 79.0 | 91.0 |
| Percent Elongation as Percent Maximum | | |
| Retained After 60 Minutes | 84.0 | 92.0 |

EXAMPLE VI

This example is presented to show the reversion resistance imparted by the novel vulcanization system to a two-way blend of 80 parts by weight natural rubber with 20 parts by weight cis-polyisoprene rubber (SN). A master-batch is prepared as in Example IV except SN is substituted for CB. Table VI shows the recipes evaluated in parts by weight along with testing data. A well known reversion resistant cure system of sulfur, OBTS, DTDM is used as the control (Sample 17). In Sample 18, N, N' di-(oxydiethylene) thiocarbamylsulfenamide (TCS) is substituted at equal part level for DTDM. Table VI shows the cure system of sulfur, TCS, and OBTS to be superior for reversion resistance to the well known cure system of sulfur, OBTS, and DTDM as measured by retained tensile, retained Monsanto Rheometer torque, and compression set.

TABLE VI

| | SAMPLE NUMBER | |
|---|---|---|
| | Control 17 | 18 |
| INGREDIENT | | |
| Masterbatch | 165.0 | 165.0 |
| Sulfur | 0.5 | 0.5 |
| OBTS | 1.5 | 1.5 |
| DTDM | 2.0 | — |
| TCS | — | 2.0 |
| TEST | | |
| Monsanto Rheometer at 350° F, ± 1° Arc | | |
| Maximum Torque | 36.0 | 35.0 |
| Time (Min.) to 95% Torque | 4.9 | 5.3 |
| Percentage of Max Torque Remaining at Time | | |
| 15 minutes | 96.0 | 100.0 |
| 30 minutes | 90.0 | 100.0 |
| Compression Set 25% Compression 48 Hours at 212° F | | |
| Cure 20 Minutes at 350° F Percent Set | 41.0 | 25.0 |
| Cure 90 Minutes at 350° F Percent Set | 29.0 | 22.0 |
| Stress-Strain Cure at 350° F | | |
| Tensile psi | | |
| 5 minutes | 3870.0 | 3580.0 |
| 40 minutes | 3150.0 | 3480.0 |
| 60 minutes | 3310.0 | 3390.0 |
| 300% Modulus psi | | |
| 5 minutes | 2385.0 | 2505.0 |
| 40 minutes | 1890.0 | 2525.0 |
| 60 minutes | 2210.0 | 2410.0 |
| Stress-Strain Cure at 350° F | | |
| Percent Elongation | | |
| 5 minutes | 440.0 | 400.0 |
| 40 minutes | 430.0 | 385.0 |
| 60 minutes | 405.0 | 390.0 |
| Tensile as Percent Maximum Retained | | |
| After 60 Minutes | 86.0 | 95.0 |
| Percent Elongation as Percent Maximum | | |
| Retained After 60 Minutes | 92.0 | 98.0 |

EXAMPLE VII

Cis-polyisoprene is mixed with various rubber compounding ingredients to provide a masterbatch according to the recipe: 100 parts by weight of cis-polyisoprene rubber, 50 parts high structure HAF carbon black, 5 parts zinc oxide, 3 parts stearic acid, 5 parts processing oil, and 2 parts antioxidant. The masterbatch is mixed in a Banbury mixer following a standard mixing procedure. Portions of the masterbatch are put on a two-roll mill, and curative ingredients are added. Table VII shows the recipes evaluated in parts by weight along with testing data. Sample 19 (control) is a widely used reversion resistant cure system of sulfur, OBTS, and DTDM while Sample 20 has N, N'-di-(oxydiethylene) thiocarbamylsulfenamide (TCS) substituted for DTDM at equal part level. Table VII shows the sulfur, OBTS, TCS cure system to be superior for reversion resistance to the control as measured by retained Monsanto Rheometer torque and compression set.

TABLE VII

| INGREDIENT | SAMPLE NUMBER | |
|---|---|---|
| | Control 19 | 20 |
| Masterbatch | 165.0 | 165.0 |
| Sulfur | 0.5 | 0.5 |
| OBTS | 1.5 | 1.5 |
| DTDM | 2.0 | — |
| TCS | — | 2.0 |
| TEST | | |
| Monsanto Rheometer at 350° F, ± 1° Arc | | |
| Maximum Torque | 38.5 | 38.0 |
| Time (Min.) to 95% Max Torque | 4.8 | 6.5 |
| Percentage of Max Torque Remaining at Time | | |
| 15 minutes | 97.0 | 100.0 |
| 30 minutes | 94.0 | 100.0 |
| Compression Set 25% Compression 48 Hours at 212° F | | |
| Cure 20 Minutes at 350° F Percent Set | 35.0 | 21.0 |
| Cure 90 Minutes at 350° F Percent Set | 23.0 | 17.0 |

EXAMPLE VIII

This example is presented to show the reversion resistance imparted by the novel cure systems to two-way blends of cis-polyisoprene with cis-polybutadiene. A masterbatch, as in Example VII, is mixed with the rubber portion being 80 parts by weight cis-polyisoprene and 20 parts by weight cis-polybutadiene. Table VIII shows the recipes evaluated in parts by weight along with testing data. The control recipe (Sample 21) employs a cure system of sulfur, OBTS, and DTDM while Sample 22 has N, N'-di-(oxydiethylene) thiocarbamylsulfenamide (TCS) substituted for DTDM at equal part level. The data in Table VIII shows the sulfur, OBTS, TCS cure system to be superior for reversion resistance to the control as measured by retained Monsanto Rheometer torque and compression set.

TABLE VIII

| INGREDIENT | SAMPLE NUMBER | |
|---|---|---|
| | Control 21 | 22 |
| Masterbatch | 165.0 | 165.0 |
| Sulfur | 0.5 | 0.5 |
| OBTS | 1.5 | 1.5 |
| DTDM | 2.0 | — |
| TCS | — | 2.0 |
| TEST | | |
| Monsanto Rheometer at 350° F, ± 1° Arc | | |
| Maximum Torque | 40.5 | 40.5 |
| Time (Min.) to 95% Max Torque | 5.4 | 6.4 |
| Percentage of Max Torque Remaining at Time | | |
| 15 minutes | 98.0 | 100.0 |
| 30 minutes | 94.0 | 100.0 |
| Compression Set 25% Compression 48 Hours at 212° F | | |
| Cure 20 Minutes at 350° F Percent Set | 36.0 | 23.0 |
| Cure 90 Minutes at 350° F Percent Set | 24.0 | 19.0 |

EXAMPLE IX

This example is presented to show the reversion resistance imparted by the novel cure systems to three-way blends of natural rubber, CB, and SBR. A masterbatch, as in Example VIII, is mixed with the rubber portion being 70 parts by weight natural rubber, 20 parts by weight cis-polybutadiene, and 10 parts by weight styrene-butadiene rubber. Table IX shows the recipes evaluated in parts by weight along with testing data. The control recipe (Sample 23) employs a cure system of sulfur, OBTS, and DTDM while Sample 24 has N, N'-di-(oxydiethylene) thiocarbamylsulfenamide (TCS) substituted for DTDM at equal part level. The data in Table IX shows the sulfur, OBTS, and TCS cure system to be superior for reversion resistance to the control as measured by retained Monsanto Rheometer torque and compression set.

TABLE IX

| INGREDIENT | SAMPLE NUMBER | |
|---|---|---|
| | Control 23 | 24 |
| Masterbatch | 165.0 | 165.0 |
| Sulfur | 0.5 | 0.5 |
| OBTS | 1.5 | 1.5 |
| DTDM | 2.0 | — |
| TCS | — | 2.0 |
| TEST | | |
| Monsanto Rheometer at 350° F, ± 1° Arc | | |
| Maximum Torque | 39.5 | 39.5 |
| Time (Min.) to 95% Max Torque | 5.4 | 6.0 |
| Percentage of Max Torque Remaining at Time | | |
| 15 minutes | 97.0 | 100.0 |
| 30 minutes | 91.0 | 99.0 |
| Compression Set 25% Compression 48 Hours at 212° F | | |
| Cure 20 Minutes at 350° F Percent | 39.0 | 25.0 |
| Cure 90 Minutes at 350° F Percent Set | 30.0 | 22.0 |

Examples I through IX show that the novel vulcanization systems of sulfur, TCS, and optionally a benzothiazole accelerator and/or a thiazole sulfenamide accelerator imparts excellent reversion to rubber compositions containing predominately natural rubber.

The reversion resistant rubber compositions disclosed herein may be used in the manufacture of tires, hose, belting, gasketing, seals, bands, and the like. These reversion resistant rubber compositions are particularly desirable for use in articles that require rubber compositions with low heat generation and excellent reversion resistance. Representative articles are solid tires, and the treads of racing tires and large pneumatic tires, such as truck, bus, airplane, off-the-road, and the like. As herein employed, the term tire tread includes that portion of a tire extending from the road contacting surface to the reinforcing elements of the tire and, hence, is inclusive of that portion of a tire which is sometimes referred to as the undertread or base. When the reversion resistant compositions of this invention are used as a tire tread, the vulcanization temperature of the tire can be increased, thereby lowering the time required to vulcanize a tire without reverting the outside surface of the tire. These compositions are also useful for articles that require the properties of a natural rubber composition, but are vulcanized at a temperature which would normally revert natural rubber.

I claim:

1. A reversion resistant rubber composition comprising (1) 100 parts by weight of a sulfur vulcanizable rubber of which at least 50 parts by weight of said rubber are selected from the group consisting of natural rubber, cis-polyisoprene and mixtures thereof, and the remaining rubber is selected from at least one of the group consisting of cis-polybutadiene, emulsion polybutadiene, styrene-butadiene, butadiene-acrylonitrile, isoprene-acrylonitrile, polychloroprene, polypentenamer, and isoprene-styrene, (2) from about 0.1 part by weight to about 3 parts by weight of sulfur per 100 parts by weight of sulfur vulcanizable rubber, (3) from about 0.5 part by weight to about 5 parts by weight of a thiocarbamyl sulfenamide per 100 parts by weight of rubber wherein said thiocarbamyl sulfenamide is selected from the group consisting of N,N'-di-(oxydiethylene) thiocarbamylsulfenamide and N,N-dimethyl-N', N'dicyclohexylthiocarbamyl-sulfenamide.

2. A composition of claim 1 containing as an ingredient a thiazole sulfenamide of the formula T—S—B, wherein T is a thiazole ring group and B is selected from the group consisting of

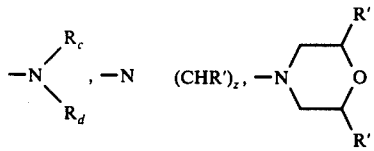

where $R_c$ and $R_d$ are selected from the group consisting of hydrogen, an alkyl radical containing 1 to 24 carbon atoms, an aryl radical containing 6 to 18 carbon atoms, an alkaryl or aralkyl radical containing 7 to 18 carbon atoms, and a cycloalkyl radical containing 3 to 8 carbon atoms, z is 2 to 7, and R' is hydrogen or an alkyl radical containing 1 to 4 carbon atoms.

3. A composition of claim 1 wherein at least 50 percent of the sulfur vulcanizable rubber is selected from the group consisting of natural rubber and cis-polyisoprene and the remaining rubber is selected from at least one of the group consisting of cis-polybutadiene, and styrene-butadiene.

4. A composition of claim 3 wherein the level of thiocarbamyl sulfenamide is from about 1 part by weight to about 3 parts by weight per 100 parts by weight of rubber.

5. A composition of claim 4 wherein the level of sulfur is from about 0.3 part by weight to about 1.5 parts by weight per 100 parts by weight of rubber.

6. A composition of claim 1 containing as an ingredient a 2-thiobenzothiazole of the formula

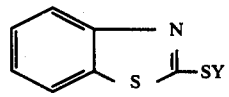

where Y is selected from the group consisting of hydrogen, an alkyl radical containing 1 to 18 carbon atoms, an aryl radical, a benzothiazolethio radical, and a mono- or divalent radical selected from the group consisting of ammonium, sodium, potassium, calcium, zinc, cadmium, copper, and lead.

7. A composition of claim 6 wherein the level of 2-thiobenzothiazole is from about 0.5 part by weight to about 3.0 parts by weight per 100 parts by weight of rubber.

8. A composition of claim 7 wherein the 2-thiobenzothiazole is 2,2'-mercaptobenzothiazole disulfide.

9. A composition of claim 2 wherein the level of thiazole sulfenamide is from about 0.5 part by weight to about 5 parts by weight per 100 parts by weight of rubber.

10. A composition of claim 9 wherein the thiazole sulfenamide is N-oxydiethylene-2-benzothiazyl sulfenamide.

11. A tire tread composition comprising (1) a sulfur vulcanizable rubber of which at least 50 percent of said rubber is selected from the group consisting of natural rubber and cis-polyisoprene, and the remaining rubber is selected from at least one of the group consisting of cis-polybutadiene and styrene-butadiene, (2) from about 0.1 part to about 3 parts by weight of sulfur per 100 parts by weight of sulfur vulcanizable rubber, (3) from about 0.5 part by weight to about 5 parts by weight of a thiocarbamyl sulfenamide per 100 parts by weight of rubber wherein said thiocarbamyl sulfenamide is selected from the group consisting of N,N'-di-(oxydiethylene) thiocarbamyl-sulfenamide and N,N-dimethyl-N',N'dicyclohexyl-thiocarbamylsulfenamide.

12. A tread composition of claim 11 wherein the level of thiocarbamyl sulfenamide is from about 1 part by weight to about 3 parts by weight per 100 parts by weight of rubber.

13. A tread composition of claim 12 wherein the level of sulfur is from about 0.3 part by weight to about 1.5 parts by weight per 100 parts by weight of rubber.

14. A tread composition of claim 11 containing as an ingredient a 2-thiobenzothiazole of the formula

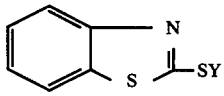

where Y is selected from the group consisting of hydrogen an alkyl radical containing 1 to 18 carbon atoms, an aryl radical, a benzothiazolethio radical, and a mono- or divalent radical selected from the group consisting of ammonium, sodium, potassium, calcium, zinc, cadmium, copper, and lead.

15. A tread composition of claim 14 wherein the level of 2-thiobenzothiazole is from about 0.5 part by weight to about 3.0 parts by weight per 100 parts by weight of rubber.

16. A tread composition of claim 15 wherein the 2-thiobenzothiazole is 2,2'-mercaptobenzothiazole disulfide.

17. A tread composition of claim 11 containing as an ingredient a thiazole sulfenamide of the formula T—S—B, wherein T is a thiazole ring group and B is selected from the group consisting of

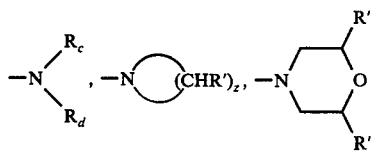

where $R_c$ and $R_d$ are selected from the group consisting of hydrogen, an alkyl radical containing 1 to 24 carbon atoms, an aryl radical containing 6 to 18 carbon atoms, an alkaryl or aralkyl radical containing 7 to 18 carbon atoms, and a cycloalkyl radical containing 3 to 8 carbon atoms, z is 2 to 7, and R' is hydrogen or an alkyl radical containing 1 to 4 carbon atoms.

18. A tread composition of claim 17 wherein the level of thiazole sulfenamide is from about 0.5 part by weight to about 5 parts by weight per 100 parts by weight of rubber.

19. The composition of claim 18 wherein the thiazole sulfenamide is N-oxydiethylene-2-benzothiazyl sulfenamide.

* * * * *